No. 671,449. Patented Apr. 9, 1901.
J. C. NIELSEN.
INSECT TRAP.
(Application filed Jan. 23, 1899.)
(No Model.)
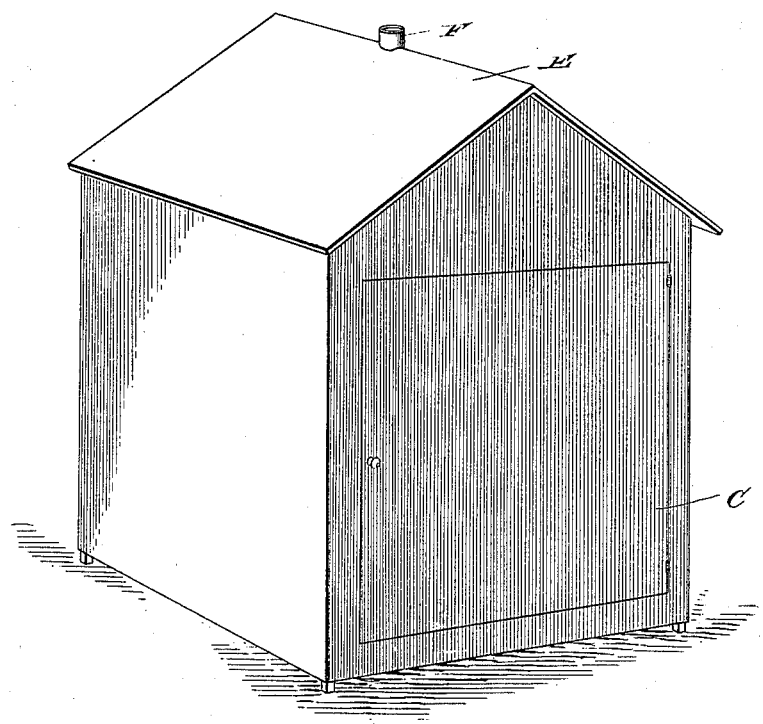
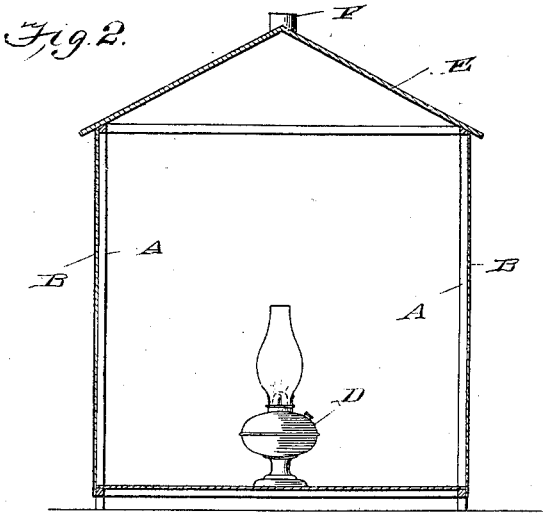
Witnesses
Inventor
Jorgen C. Nielsen,
Attorneys

UNITED STATES PATENT OFFICE.

JORGEN CHRISTIAN NIELSEN, OF DRAPER, UTAH.

INSECT-TRAP.

SPECIFICATION forming part of Letters Patent No. 671,449, dated April 9, 1901.

Application filed January 23, 1899. Serial No. 703,151. (No model.)

*To all whom it may concern:*

Be it known that I, JORGEN CHRISTIAN NIELSEN, residing at Draper, in the county of Salt Lake and State of Utah, have invented a new and useful Insect-Trap, of which the following is a specification.

This invention relates generally to an insect trap and destroyer, and more particularly to one adapted for use at night, the object being to employ both a light and a bait for the purpose of drawing the insects. The bait will be sticky and calculated to hold them after being attracted by the light.

With this object in view my invention consists, essentially, of a frame covered with canvas or similar material capable of containing a lamp inside and also capable of receiving a coat of adhesive substance.

The invention consists also in certain details of construction and novelties of combination, all of which will be hereinafter fully described, and pointed out in the appended claim.

In the drawings forming part of this specification, Figure 1 is a view of my insect-trap complete. Fig. 2 is a vertical sectional view.

In carrying out my invention I employ a light wooden frame A, rectangular in shape, and about which is fitted a tight covering of canvas or other suitable material B. A door C is provided through which a lamp D can be inserted into the canvas-covered frame, and a suitable roof or covering E, of oil-cloth, board, or other suitable waterproof material, may be employed, and the roof or cover is provided with an outlet F, under which the lamp is located, so that the heat can pass out through the said outlet. The canvas or other fabric covering is coated with any suitable adhesive substance and the trap placed out in the open air and a lamp inserted therein. Insects of all description will be attracted by both the light and enticing bait and will settle upon the fabric covering through which the light shines, and thereby be entrapped, inasmuch as they will adhere to the substance covering the trap. The insects so entrapped can be brushed off whenever it is desired and another coat of the adhesive substance applied.

By constructing my trap as above described the walls are straight and smooth, so that they can be readily cleaned and recoated at any time by the use of a large brush, thereby quickly preparing them for use. The roof or cover is made to project beyond the vertical walls at all points, whereby the door is kept from opening on the walls and diluting or washing off the adhesive substance, and thus rendering the trap useless. The corner-posts of the frame project below the bottom and side walls of the trap, and thereby keep the trap off the ground and prevent the moisture of the ground from rotting or injuring the fabric with which the frame is covered.

It will thus be seen that I provide an exceedingly cheap, simple, and efficient construction of insect-trap.

Having thus fully described my invention, what I claim as new, and desire to secure by Letters Patent of the United States, is—

An insect-trap comprising a rectangular frame, translucent material secured thereto forming plane flat vertical walls, the exterior of which is provided with an adhesive substance and one of the walls is provided with a door, the frame extending below said walls at the corners, a roof of waterproof material on the frame projecting beyond the walls at all points, and provided with a heat-outlet at the top, and a lamp within the frame.

JORGEN CHRISTIAN NIELSEN.

Witnesses:
W. D. EDMONDS,
P. A. NIELSEN.